United States Patent
Kuo

(10) Patent No.: US 8,009,368 B2
(45) Date of Patent: Aug. 30, 2011

(54) ASPHERICAL FIBER COUPLING LENS

(75) Inventor: Ming-Che Kuo, Taipei (TW)

(73) Assignee: E-Pin Optical Industry Co., Ltd., Taipei (TW)

(*) Notice: Subject to any disclaimer, the term of this patent is extended or adjusted under 35 U.S.C. 154(b) by 0 days.

(21) Appl. No.: 12/203,687

(22) Filed: Sep. 3, 2008

(65) Prior Publication Data

US 2011/0128635 A1 Jun. 2, 2011

(30) Foreign Application Priority Data

Apr. 16, 2008 (TW) ............... 97113866 A

(51) Int. Cl.
*G02B 3/02* (2006.01)
*G02B 13/18* (2006.01)

(52) U.S. Cl. ...................... 359/718; 359/708

(58) Field of Classification Search ............... 359/708, 359/718
See application file for complete search history.

(56) References Cited

U.S. PATENT DOCUMENTS 6,829,105 B2 * 12/2004 Kubo ..................... 359/719

* cited by examiner

*Primary Examiner* — William C Choi

(74) *Attorney, Agent, or Firm* — Muncy, Geissler, Olds, Lowe, PLLC

(57) ABSTRACT

An aspherical fiber coupling lens applied to a photoelectric coupling module is disclosed. The spherical fiber coupling lens is a bi-convex lens with positive refraction power and having a first optical surface and a second optical surface, both are aspherical surfaces while optical features of the lens satisfy the following conditions:

$$0.5 < \frac{d_2}{f} < 1.5;$$

$$1.0 < \frac{R_1 - R_2}{R_1 + R_2} < 2.0;$$

$$1.2 < \left(\frac{1}{R_1} - \frac{1}{R_2}\right) \cdot f < 2.2$$

wherein f is the effective focal length of the lens, $d_2$ is thickness of the lens on optical axis, $N_d$ is refraction index of the lens, $R_1$, $R_2$ respectively are curvature radiuses of the first optical surface and the second optical surface of the lens. Thereby the lens has features of small focus, compact volume and high coupling efficiency so that applications of the photoelectric coupling module are improved.

5 Claims, 5 Drawing Sheets

ASPHERICAL FIBER COUPLING LENS

BACKGROUND OF THE INVENTION

The present invention relates to a fiber coupling lens that is applied to a photoelectric coupling module for efficiently collecting and focusing light from a semiconductor laser to be transmitted by optical fiber.

Optical communication is one of promising industries in recent years. In optical communication elements, a photoelectric coupling module includes a light source such as laser diode or LED, a fiber coupling lens and an optical fiber. A data light beam emitted from the laser diode passes the fiber coupling lens, then converges at the optical fiber for transmission. Refer to FIG. 1, due to small diameter of the optical fiber ranging from several microns to decades of microns and small size of the fiber coupling lens, not only precise alignment in directions (X-directions) perpendicular to the optical direction of the laser beam in the optical fiber is required, but also accurate alignment in the direction (Z-direction) of the optical axis is required.

Conventional fiber coupling lens may be formed by a single-piece of lens or multiple-piece lens. The fiber coupling lens formed by the multiple-piece lens collects maximum amount of light and has good focusing effect. However, single-piece type fiber coupling lens is more competitive in the market. As to short focal length (from a light source to focus point) single-piece type fiber coupling lens, a bi-convex design is the most common used, as shown in U.S. Pat. Nos. 5,764,838, 4,932,763, 5,293,269, and JP62059912. Generally, the diameter of the fiber coupling lens is quite small so that diffraction may happen when the distance to the focus point is relative long. Besides the problem of diffraction, alignment accuracy and coupling efficiency of the lens should also be required, as disclosed in U.S. Pat. No. 5,642,233, US2003/012496, JP09-061665, JP63-010119, JP05-273463, JP62-108217, JP02-150816, and JP07-128616 etc. Moreover, while the data light from a laser source of the photoelectric coupling module passing through the fiber coupling lens, the temperature of the lens will be increase. In order to avoid deformation of the fiber coupling lens caused by a long term heat exposure, the fiber coupling lens is made of glass by glass molding, as shown in JP63-297233, US2002/114085, TW240706, and TWD 076092 etc.

In order to achieve optimal effects of the fiber coupling unit (module), the fiber coupling lens has optical features such as small focal point, high coupling efficiency, and large numbers of apertures on objective side. In order to achieve above effects, conventional fiber coupling lens is designed to be formed by diffraction lens, as shown in WO2007145118, JP2006-227366, and US2003/0012496 etc. Yet such design also increases difficulties in manufacturing so that the cost is difficult to be reduced. Thus there is a need to develop a fiber coupling lens having simple optical surface with low cost and made by glass molding technique for enhancing development of optical communication industries.

SUMMARY OF THE INVENTION

Therefore it is a primary object of the present invention to provide a fiber coupling lens which is a bi-convex lens with positive refraction power having a first aspherical optical surface and a second aspherical optical surface and its optical features satisfy the following conditions:

$$0.5 < \frac{d_2}{f} < 1.5; \quad (1)$$

$$1.0 < \frac{R_1 - R_2}{R_1 + R_2} < 2.0; \quad (2)$$

$$1.2 < \left(\frac{1}{R_1} - \frac{1}{R_2}\right) \cdot f < 2.2; \quad (3)$$

$$0.001 < \frac{(N_d - 1)}{R_1} \cdot \frac{f}{N_d} < 0.15; \quad (4)$$

$$0.2 < (N_d - 1)\frac{d_2^2}{f^2} < 1.2; \quad (5)$$

wherein f is effective focal length of the lens, $d_2$ is thickness of the lens on optical axis, $N_d$ is refraction index of the lens, $R_1$, $R_2$ respectively are curvature radiuses of the first optical surface and the second optical surface of the lens on optical axis. Thereby the focusing as well as localization precision is effectively improved, the coupling efficiency is high and the number of apertures on objective side is large. The lens has simple structure and the manufacturing cost is low. Therefore, applications of the fiber coupling lens are broadened.

It is another object of the present invention to provide a fiber coupling lens made of glass by precision glass molding technique and refraction index thereof satisfies the following conditions:

$$70 < N_d \cdot v_d \quad (6)$$

wherein $N_d$ is refraction index of the lens and $v_d$ is Abbe number of the lens.

DETAILED DESCRIPTION OF THE PREFERRED EMBODIMENT

Figure 1:
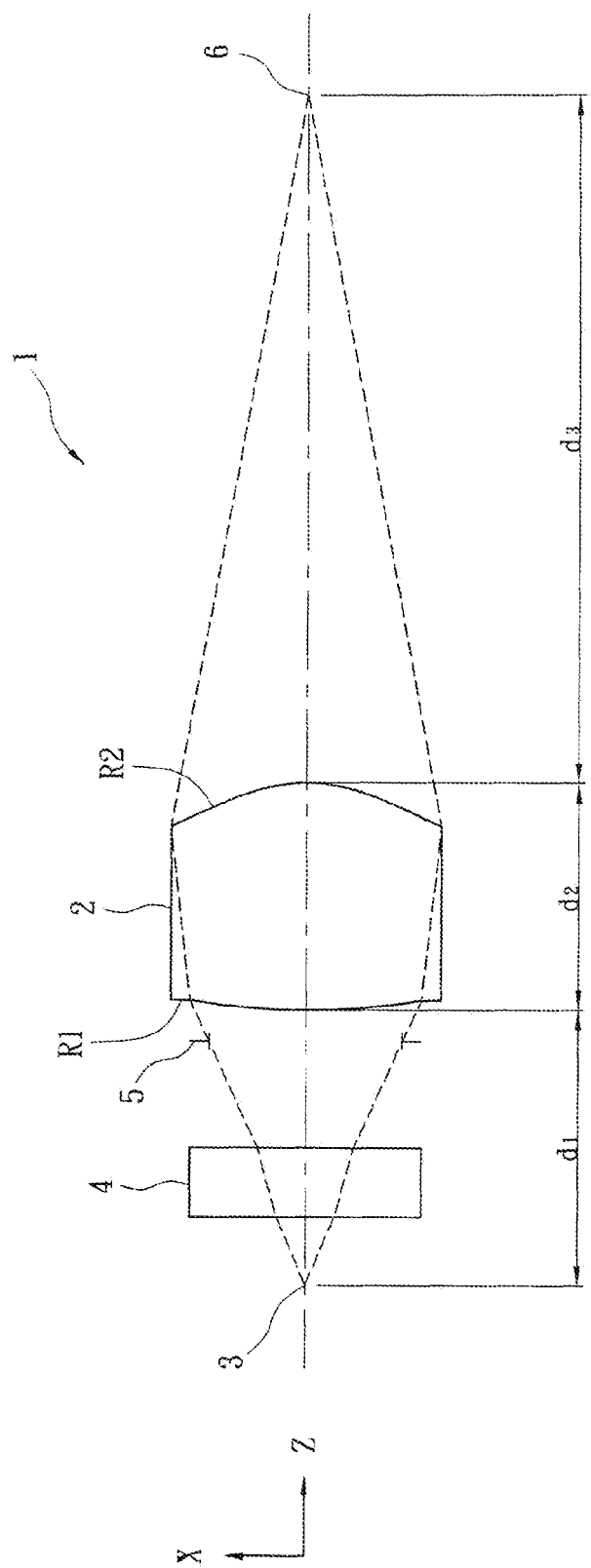
FIG. 1 is a schematic drawing showing the structure of an embodiment of a fiber coupling lens according to the present invention.

Refer to FIG. 1, an embodiment according to the present invention is applied to a photoelectric coupling module 1, along an optical axis Z of a fiber coupling lens 2, having a light source 3 which is a semiconductor laser emitting data light with wavelength of 1310 nm, a cover glass 4 and an aperture 5 that is a middle-positioned aperture disposed between the cover glass 4 and the fiber coupling lens 2. After the data light passing through the cover glass 4 and the aperture 5, it is focused onto a focal point 6 by the fiber coupling lens 2 and being received and transmitted by the optical fiber (not shown in figure). There is no restriction on range of wavelength of the semiconductor laser. There is also no limit on the distance between the light source 3 and the focal point 6.

Figure 2:
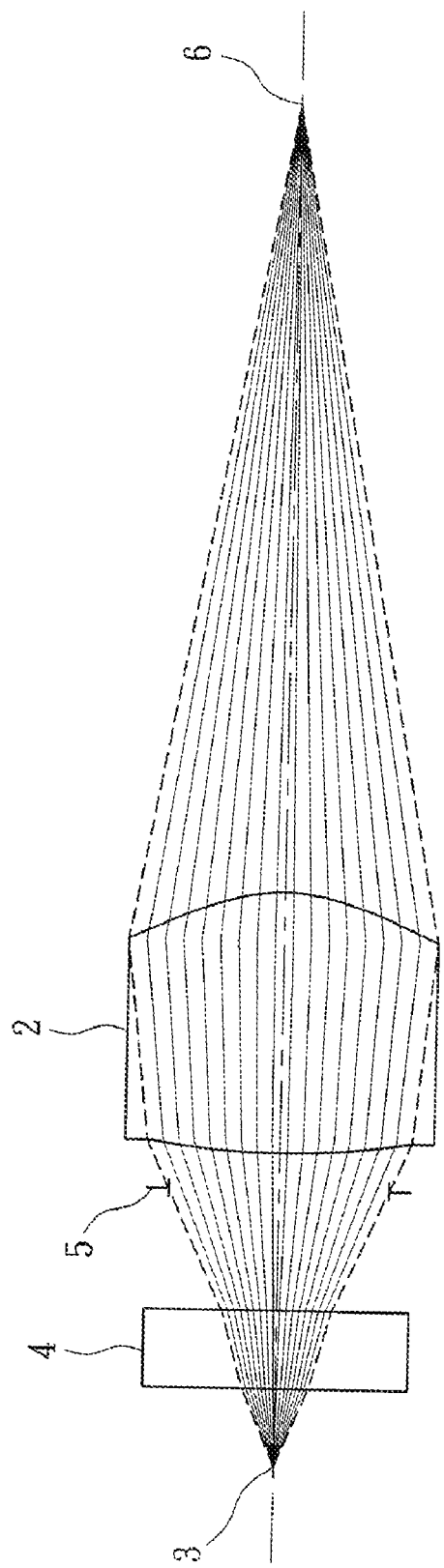
FIG. 2 is a drawing showing optical path of a fiber coupling lens according to the present invention and light path.

Refer to FIG. 2, the fiber coupling lens 2 is an aspherical bi-convex lens with an aspherical first optical surface $R_1$ and an aspherical second optical surface $R_2$, made of glass or plastic material with the refraction index $N_d$ that is higher than 1.5 and the Abbe number $v_d$ that is larger than 46 while the optical properties of the lens satisfy the following conditions:

$$0.5 < \frac{d_2}{f} < 1.5;$$

$$1.0 < \frac{R_1 - R_2}{R_1 + R_2} < 2.0;$$

$$1.2 < \left(\frac{1}{R_1} - \frac{1}{R_2}\right) \cdot f < 2.2$$

$$0.001 < \frac{(N_d - 1)}{R_1} \cdot \frac{f}{N_d} < 0.15;$$

$$0.2 < (N_d - 1)\frac{d_2^2}{f^2} < 1.2;$$

wherein f is the effective focal length of the lens, $d_2$ is thickness of the lens on optical axis, $N_d$ is refraction index of the lens, $R_1$, $R_2$ respectively are curvature radiuses of the first optical surface and the second optical surface of the lens on optical axis.

The aspherical surface formula of the first optical surface $R_1$ and the second optical surface $R_2$ is as shown in equation (7):

$$Z = \frac{ch^2}{1 + \sqrt{(1 - (1+K)c^2h^2)}} + A_4h^4 + A_6h^6 + A_8h^8 + A_{10}h^{10} + A_{12}h^{12} \quad (7)$$

wherein c is curvature radius, h is height of the lens,

K is conic constant, and $A_4 A_6 A_8 A_{10} A_{12}$ respectively are the $4^{th}$, $6^{th}$, $8^{th}$, $10^{th}$, $12^{th}$ order aspherical coefficients.

In accordance with above structure, the focusing and the localization precision are effectively improved, the coupling efficiency is high and the number of apertures on objective side is large. Thus the simple structure and the low manufacturing cost of the lens are achieved. Therefore, applications of the fiber coupling lens and the related module are improved.

The following embodiments are described in details. The list (1) to list (6) include the radius of curvature R (unit: mm) on the Z optical axis of the first optical surface $R_1$ and the second optical surface $R_2$, the thickness $d_2$ (unit: mm) of the fiber coupling lens 2, the effective focal length f of the lens, the thickness $d_2$ of the lens, the refraction index $n_F$ of the lens, the number of aperture on objective side $NA_O$, the number of aperture on image side $NA_I$, and the fiber coupling efficiency $\eta$.

The First Embodiment

The fiber coupling lens 2 in this embodiment is made of glass material with the refraction index $N_d$ of 1.583, and the Abbe number $v_d$ of 59.4.

TABLE ONE

| f = 1.182 nF = 1.590 | | | | |
|---|---|---|---|---|
| | | $d_2$ | $N_d$ | $v_d$ |
| The first optical surface | | | | |
| $R_1$ | 3.747745 | 1.200 | 1.583 | 59.4 |
| K | 4.656747 | | | |
| $A_4$ | 0.118695 | | | |
| $A_6$ | 0.740645 | | | |
| $A_8$ | −0.027967 | | | |
| $A_{10}$ | −3.62406 | | | |
| $A_{12}$ | 4.828305 | | | |
| The second optical surface | | | | |
| $R_2$ | −0.724872 | | | |
| K | −0.380312 | | | |
| $A_4$ | −0.325224 | | | |
| $A_6$ | 5.726254 | | | |
| $A_8$ | −24.500778 | | | |
| $A_{10}$ | 52.185614 | | | |
| $A_{12}$ | −40.830891 | | | |
| $\eta$ = 69.20% | | | | |
| $NA_O$ = 0.4 | | | $NA_I$ = 0.23 | | the following results are obtained through the table one:

$$\frac{d_2}{f} = 1.0156;$$

$$\frac{R_1 - R_2}{R_1 + R_2} = 1.4796;$$

$$\left(\frac{1}{R_1} - \frac{1}{R_2}\right) \cdot f = 1.9453$$

$$\frac{(N_d - 1)}{R_1} \cdot \frac{f}{N_d} = 0.1161;$$

$$(N_d - 1)\frac{d_2^2}{f^2} = 0.6014;$$

$$N_d \cdot v_d = 94.04$$

The above results satisfy equation (1), equation (2), equation (3) equation (4), equation (5) and equation (6).

Figure 3:
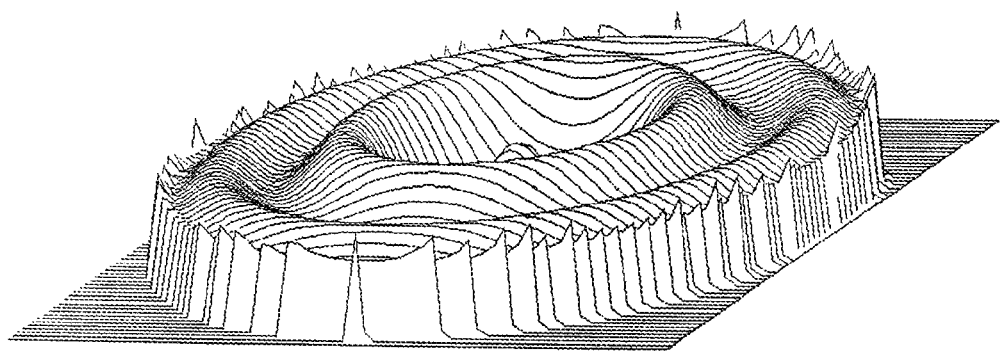
FIG. 3 is a wavefront aberration of an embodiment according to the present invention.

When the light source 3 emits laser light with wavelength of 1310 nm, the laser light is collected and focused onto the focusing point 6 by the fiber coupling lens 2 because the wavefront of the laser light is a spherical wave. The wavefront of the focusing point 6 is shown in FIG. 3. Through this figure, root mean square of Wavefront Aberration is obtained and is equal to $0.0321\lambda$rms. This proves that the embodiment has features of small focus, compact volume and high coupling efficiency so that the applications are improved.

The Second Embodiment

The fiber coupling lens 2 in this embodiment is made of glass material with the refraction index $N_d$ of 1.583, and the Abbe number $v_d$ of 59.4.

TABLE TWO

| f = 1.258 nF = 1.590 | | | | |
|---|---|---|---|---|
| | | $d_2$ | $N_d$ | $v_d$ |
| The first optical surface | | | | |
| $R_1$ | 3.747745 | 1.513 | 1.583 | 59.4 |
| K | 4.913352 | | | |
| $A_4$ | 0.118695 | | | |
| $A_6$ | 0.740645 | | | |

TABLE TWO-continued f = 1.258 nF = 1.590

| | |
|---|---|
| $A_8$ | −0.027967 |
| $A_{10}$ | −3.62406 |
| $A_{12}$ | 4.828305 |
| The second optical surface | |
| $R_2$ | −0.756071 |
| K | −0.389121 |
| $A_4$ | −0.075934 |
| $A_6$ | 2.520131 |
| $A_8$ | −8.903683 |
| $A_{10}$ | 16.115097 |
| $A_{12}$ | −10.30923 |

η = 76.70%
$NA_O = 0.4$   $NA_I = 0.25$ the following results are obtained through the table two:

$$\frac{d_2}{f} = 1.2023;$$

$$\frac{R_1 - R_2}{R_1 + R_2} = 1.5054;$$

$$\left(\frac{1}{R_1} - \frac{1}{R_2}\right) \cdot f = 1.9996$$

$$\frac{(N_d - 1)}{R_1} \cdot \frac{f}{N_d} = 0.1236;$$

$$(N_d - 1)\frac{d_2^2}{f^2} = 0.8430;$$

$$N_d \cdot v_d = 94.04$$

The above results satisfy equation (1), equation (2), equation (3), equation (4), equation (5) and equation (6).

Figure 4:
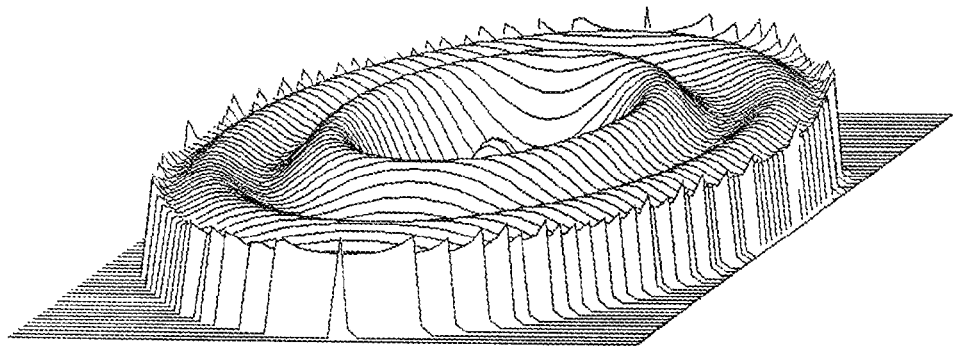
FIG. 4 shows wavefront aberration of an embodiment according to the present invention.

When the light source 3 emits laser light with wavelength of 1310 nm, the laser light is collected and focused onto the focusing point 6 by the fiber coupling lens 2. The wavefront of the focusing point 6 is shown in FIG. 4. Through this figure, root mean square of Wavefront Aberration is obtained and is equal to 0.0225λrms. This proves that the embodiment has features of small focus, compact volume and high coupling efficiency so that the applications are improved.

The Third Embodiment

The fiber coupling lens 2 in this embodiment is made of glass material with the refraction index $N_d$ of 1.514, and the Abbe number $v_d$ of 63.7.

TABLE THREE f = 1.167 nF = 1.522

| | | $d_2$ | $N_d$ | $v_d$ |
|---|---|---|---|---|
| The first optical surface | | | | |
| $R_1$ | 141.839324 | 1.000 | 1.514 | 63.7 |
| K | 44818.240 | | | |
| $A_4$ | 0.356 | | | |
| $A_6$ | 1.404 | | | |
| $A_8$ | 5.221 | | | |
| $A_{10}$ | −23.444 | | | |
| $A_{12}$ | 21.081 | | | |
| The second optical surface | | | | |
| $R_2$ | −0.587845 | | | |
| K | −0.28625 | | | |
| $A_4$ | −0.520486 | | | |
| $A_6$ | 8.75882 | | | |

TABLE THREE-continued f = 1.167 nF = 1.522

| | |
|---|---|
| $A_8$ | −28.193085 |
| $A_{10}$ | 38.519421 |
| $A_{12}$ | 10.633482 |

η = 63.00%
$NA_O = 0.4$   $NA_I = 0.22$ the following results are obtained through the table three:

$$\frac{d_2}{f} = 0.8569;$$

$$\frac{R_1 - R_2}{R_1 + R_2} = 1.0083;$$

$$\left(\frac{1}{R_1} - \frac{1}{R_2}\right) \cdot f = 1.9935$$

$$\frac{(N_d - 1)}{R_1} \cdot \frac{f}{N_d} = 0.0028;$$

$$(N_d - 1)\frac{d_2^2}{f^2} = 0.3776;$$

$$N_d \cdot v_d = 96.46$$

The above results satisfy equation (1), equation (2), equation (3) equation (4), equation (5) and equation (6).

Figure 5:
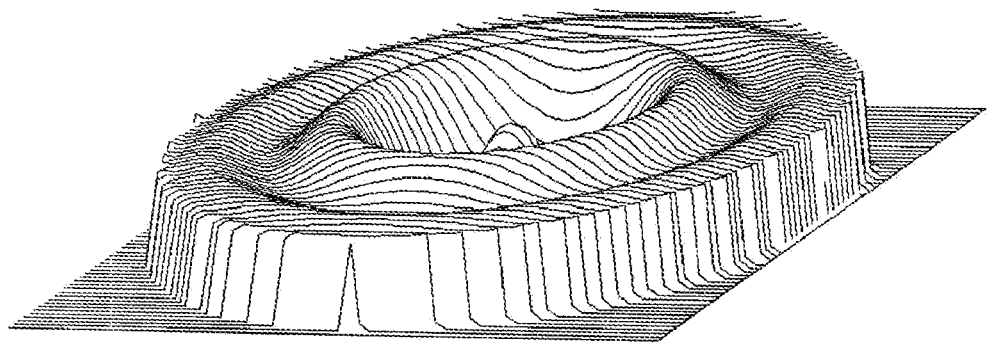
FIG. 5 shows wavefront aberration of another embodiment according to the present invention.

When the light source 3 emits laser light with wavelength of 1310 nm, the laser light is collected and focused onto the focusing point 6 by the fiber coupling lens 2. The wavefront of the focusing point 6 is shown in FIG. 5. Through this figure, root mean square of Wavefront Aberration is obtained and is equal to 0.0563λrms. This proves that the embodiment has features of small focus, compact volume and high coupling efficiency so that the applications are improved.

The Fourth Embodiment

The fiber coupling lens 2 in this embodiment is made of glass material with the refraction index $N_d$ of 1.58313, and the Abbe number $v_d$ of 59.4.

TABLE FOUR f = 1.127 nF = 1.590

| | | $d_2$ | $N_d$ | $v_d$ |
|---|---|---|---|---|
| The first optical surface | | | | |
| $R_1$ | 4.264219 | 0.000 | 0.000 | 0.0 |
| K | 62.694834 | | | |
| $A_4$ | 0.002634 | | | |
| $A_6$ | 1.442488 | | | |
| $A_8$ | 2.768814 | | | |
| $A_{10}$ | −6.456358 | | | |
| $A_{12}$ | −44.02713 | | | |
| The second optical surface | | | | |
| $R_2$ | −0.761144 | | | |
| K | −0.350427 | | | |
| $A_4$ | −0.334724 | | | |
| $A_6$ | 5.580306 | | | |
| $A_8$ | −24.597471 | | | |
| $A_{10}$ | 53.153555 | | | |
| $A_{12}$ | −40.022299 | | | |

η = 76.00%
$NA_O = 0.4$   $NA_I = 0.25$ the following results are obtained through the table four:

$$\frac{d_2}{f} = 1.3539;$$

$$\frac{R_1 - R_2}{R_1 + R_2} = 1.4345;$$

$$\left(\frac{1}{R_1} - \frac{1}{R_2}\right) \cdot f = 1.7457$$

$$\frac{(N_d - 1)}{R_1} \cdot \frac{f}{N_d} = 0.0974;$$

$$(N_d - 1)\frac{d_2^2}{f^2} = 1.0689;$$

$$N_d \cdot v_d = 94.04$$

The above results satisfy equation (1), equation (2), equation (3), equation (4), equation (5) and equation (6).

Figure 6:
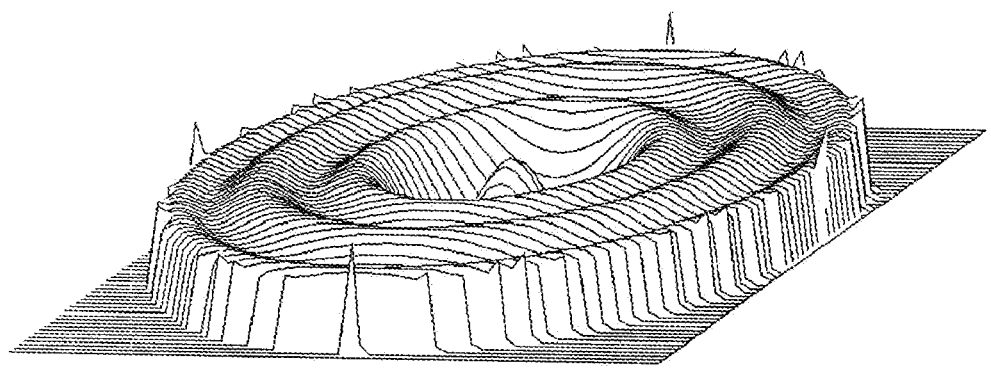
FIG. 6 shows wavefront aberration of a further embodiment according to the present invention.

When the light source 3 emits laser light with wavelength of 1310 nm, the laser light is collected and focused onto the focusing point 6 by the fiber coupling lens 2. The wavefront of the focusing point 6 is shown in FIG. 6. Through this figure, root mean square of Wavefront Aberration is obtained and is equal to 0.0278λrms. This proves that the embodiment has features of small focus, compact volume and high coupling efficiency so that the applications are improved.

The Fifth Embodiment

The fiber coupling lens 2 in this embodiment is made of glass material with the refraction index $N_d$ of 1.583, and the Abbe number $v_d$ of 59.4.

TABLE FIVE

| f = 1.148 nF = 1.590 | | | |
|---|---|---|---|
| | $d_2$ | $N_d$ | $v_d$ |
| The first optical surface | | | |
| $R_1$ 31.884136 | 1.000 | 1.583 | 59.4 |
| K 1963.124 | | | |
| $A_4$ 0.196 | | | |
| $A_6$ 1.258 | | | |
| $A_8$ 3.527 | | | |
| $A_{10}$ −14.940 | | | |
| $A_{12}$ 12.330 | | | |
| The second optical surface | | | |
| $R_2$ −0.659849 | | | |
| K −0.363483 | | | |
| $A_4$ −0.487625 | | | |
| $A_6$ 7.111876 | | | |
| $A_8$ −26.371641 | | | |
| $A_{10}$ 46.812404 | | | |
| $A_{12}$ −20.709032 | | | |
| η = 64.00% | | | |
| $NA_O$ = 0.4 | | $NA_I$ = 0.22 | | the following results are obtained through the table five:

$$\frac{d_2}{f} = 0.8711;$$

$$\frac{R_1 - R_2}{R_1 + R_2} = 1.0422;$$

$$\left(\frac{1}{R_1} - \frac{1}{R_2}\right) \cdot f = 1.7757$$

$$\frac{(N_d - 1)}{R_1} \cdot \frac{f}{N_d} = 0.0133;$$

$$(N_d - 1)\frac{d_2^2}{f^2} = 0.4425;$$

$$N_d \cdot v_d = 94.04$$

The above results satisfy equation (1), equation (2), equation (3) equation (4), equation (5) and equation (6).

Figure 7:
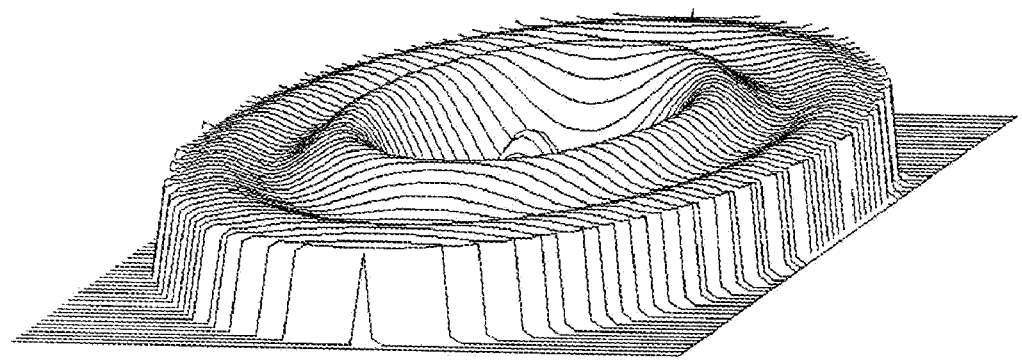
FIG. 7 shows wavefront aberration of a further embodiment according to the present invention.

When the light source 3 emits laser light with wavelength of 1310 nm, the laser light is collected and focused onto the focusing point 6 by the fiber coupling lens 2. The wavefront of the focusing point 6 is shown in FIG. 7. Through this figure, root mean square of Wavefront Aberration is obtained and is equal to 0.0502λrms. This proves that the embodiment has features of small focus, compact volume and high coupling efficiency so that the applications are improved.

The Sixth Embodiment

The fiber coupling lens 2 in this embodiment is made of glass material with the refraction index $N_d$ of 1.731, and the Abbe number $v_d$ of 40.5.

TABLE SIX

| f = 1.130 nF = 1.743 | | | |
|---|---|---|---|
| | $d_2$ | $N_d$ | $v_d$ |
| The first optical surface | | | |
| $R_1$ 7.974495 | 1.000 | 1.731 | 40.5 |
| K 58.054 | | | |
| $A_4$ 0.108 | | | |
| $A_6$ 0.041 | | | |
| $A_8$ 4.877 | | | |
| $A_{10}$ 7.254 | | | |
| $A_{12}$ −51.368 | | | |
| The second optical surface | | | |
| $R_2$ −0.843268 | | | |
| K 0.783698 | | | |
| $A_4$ −0.431282 | | | |
| $A_6$ 8.248266 | | | |
| $A_8$ −30.200965 | | | |
| $A_{10}$ 51.605569 | | | |
| $A_{12}$ −6.379389 | | | |
| η = 58.00% | | | |
| $NA_O$ = 0.4 | | $NA_I$ = 0.2 | | the following results are obtained through the table six:

$$\frac{d_2}{f} = 0.8849;$$

$$\frac{R_1 - R_2}{R_1 + R_2} = 1.2365;$$

$$\left(\frac{1}{R_1} - \frac{1}{R_2}\right) \cdot f = 1.4817$$

$$\frac{(N_d - 1)}{R_1} \cdot \frac{f}{N_d} = 0.0598;$$

$$(N_d - 1)\frac{d_2^2}{f^2} = 0.5723;$$

$$N_d \cdot v_d = 70.09$$

The above results satisfy equation (1), equation (2), equation 3) equation (4), equation (5) and equation (6).

Figure 8:
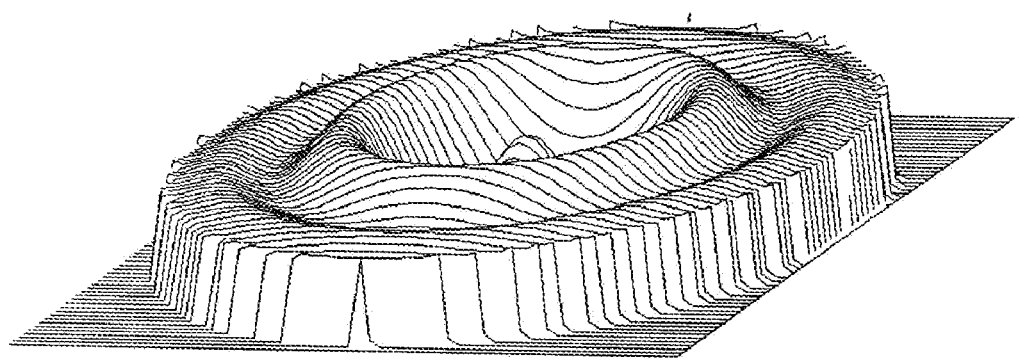
FIG. 8 shows wavefront aberration of a further embodiment according to the present invention.

When the light source 3 emits laser light with wavelength of 1310 nm, the laser light is collected and focused onto the focusing point 6 by the fiber coupling lens 2. The wavefront of the focusing point 6 is shown in FIG. 8. Through this figure, root mean square of Wavefront Aberration is obtained and is equal to 0.0502λrms. This proves that the embodiment has features of small focus, compact volume and high coupling efficiency so that the applications are improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An aspherical fiber coupling lens that is a biconvex lens with positive refraction power and is applied to a photoelectric coupling module comprising: a first optical surface and a second optical surface; wherein both the first optical surface and the second optical surface are aspherical surfaces and satisfy following conditions:

$$0.5 < \frac{d_2}{f} < 1.5;$$

$$1.0 < \frac{R_1 - R_2}{R_1 + R_2} < 2.0;$$

$$1.2 < \left(\frac{1}{R_1} - \frac{1}{R_2}\right) \cdot f < 2.2$$

wherein f is the effective focal length of the lens, $d_2$ is thickness of the lens on optical axis, and $R_1$, $R_2$ respectively are curvature radiuses of the first optical surface and the second optical surface of the lens on optical axis.

2. The aspherical fiber coupling lens as claimed in claim 1, wherein the fiber coupling lens further satisfies following condition:

$$0.001 < \frac{(N_d - 1)}{R_1} \cdot \frac{f}{N_d} < 0.15;$$

wherein f is the effective focal length of the lens, $N_d$ is refraction index of the lens, and $R_1$ is curvature radius of the first optical surface on optical axis.

3. The aspherical fiber coupling lens as claimed in claim 1, wherein the fiber coupling lens further satisfies following condition:

$$0.2 < (N_d - 1)\frac{d_2^2}{f^2} < 1.2;$$

wherein f is the effective focal length of the lens, $d_2$ is thickness of the lens on optical axis, and $N_d$ is refraction index of the lens.

4. The aspherical fiber coupling lens as claimed in claim 1, wherein the aspherical fiber coupling lens is made of glass.

5. The aspherical fiber coupling lens as claimed in claim 4, wherein the fiber coupling lens further satisfies following condition:

$$70 < N_d \cdot v_d$$

wherein $N_d$ is refraction index of the lens and $v_d$ is Abbe number of the lens.

\* \* \* \* \*